Nov. 3, 1964   H. L. COONRADT ET AL   3,155,604
HYDROCRACKING WITH REDUCED CATALYST AGING
Filed Feb. 23, 1960   2 Sheets-Sheet 1

Inventors
Harry L. Coonradt
Joseph N. Miale
By Andrew L. Gabriault
Attorney

Inventors
Harry L. Coonradt
Joseph N. Miale
By Andrew L. Gabriault
Attorney 3,155,604
HYDROCRACKING WITH REDUCED
CATALYST AGING
Harry L. Coonradt, Woodbury, and Joseph N. Miale, Runnemede, N.J., assignors to Socony Mobil Oil Company, Inc., a corporation of New York
Filed Feb. 23, 1960, Ser. No. 10,165
6 Claims. (Cl. 208—78)

This invention relates to the conversion of high boiling hydrocarbon mixtures, such as are derived from crude petroleum, shale oil and the like, into lower boiling hydrocarbons, particularly gasoline and fuel oil. More precisely, it relates to the hydrocracking of such high boiling hydrocarbons in a manner which minimizes the loss of activity of the catalyst used with its time of use.

Catalytic cracking processes in general are such that, during the course of the reaction, carbonaceous contaminants, usually called coke, are deposited on the catalyst. The amount of these deposits is such that in conventional catalytic cracking it is necessary to continuously cycle the catalyst between a reaction zone and a regeneration zone in which the coke is removed.

It is known that in hydrocracking the deposits of carbonaceous materials on the catalyst are much more moderate than in conventional catalytic cracking. This difference is sufficiently marked that most hydrocracking processes suggest arranging the catalyst in a thick mass or bed through which the charge is run until such time as it is felt necessary to shut the operation down and recondition the catalyst by removal of the carbonaceous material. The progressive deposition of this carbonaceous material on the catalyst is usually termed "aging."

For a given application, a hydrocracking process will be designed to give a fixed amount of conversion. Normally, the space velocity is fixed and needed adjustments to the degree of conversion are made by adjusting the reaction temperature. The primary need for adjustment is, of course, the result of the catalyst aging. As the catalyst ages it becomes less active. Therefore, to maintain a fixed degree of conversion, it is necessary to periodically adjust the reaction temperature upwardly to compensate for loss in catalyst activity. These upward adjustments in temperature are normally accompanied by a deterioration in the amount and quality of the desirable products. When this deterioration has reached an economically intolerable level, the entire process is shut down and the catalyst regenerated.

It is obvious that any processing technique which reduces the rate of aging also reduces the frequency with which shutdowns for regeneration are needed, and by increasing on stream time is of economic significance. Moreover, a certain amount of catalyst activity is never recovered by regeneration. Thus, the usual catalyst is limited in its useful life to a certain number of regenerations. Consequently, the more frequently regeneration is required, the shorter the over-all life of the catalyst.

One prior art technique for reducing the aging rate is to operate at a very high hydrogen pressure. For this purpose pressures as high as 300–700 atmospheres have been suggested. High pressures, however, in their turn, also add materially to the cost of building and operating the hydrocracking plant.

We have discovered that one particular class of compounds is responsible for much of the catalyst aging that occurs and by use of this discovery have developed a process by which yields of desirable products may be improved, equipment and operating costs reduced, and catalyst life prolonged.

A major object of this invention is to hydrocrack high boiling hydrocarbon mixtures to lower boiling hydrocarbons in an efficient and economical manner.

Another object of this invention is to provide a hydrocracking process in which catalyst aging is minimized.

These and other objects of the invention will be apparent from the following description thereof.

This invention will be best understood by referring to the attached drawings, of which:

Figure 1:
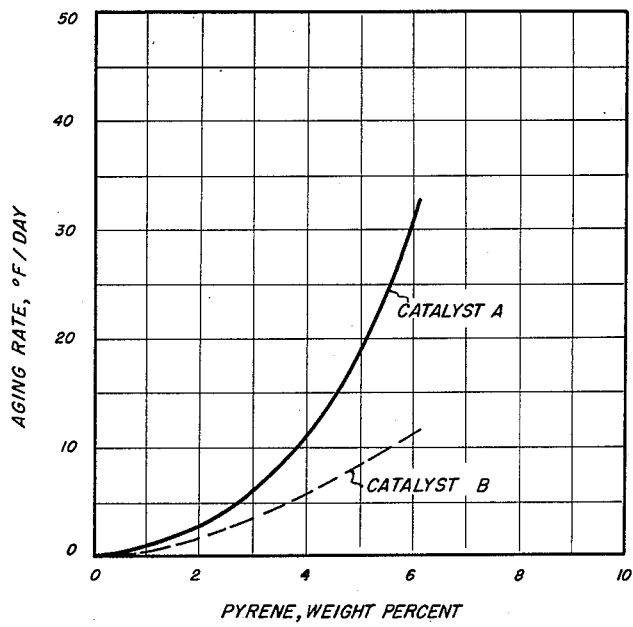
FIGURE 1 is a graph showing the relationship between catalyst aging rate and charge stock pyrene content.

We have discovered that one class of compounds, the pyrenes, which are commonly found in the higher boiling portions of petroleum-derived hydrocarbon mixtures, are very large contributors to hydrocracking catalyst aging. The terms "pyrene" and "pyrenes" are used herein to include all compounds containing the fused four-ringed structure of pyrene. It includes alkyl substituted pyrenes and other pyrene derivatives.

As used herein, the term "aging rate" means the number of degrees Fahrenheit of adjustment in the reaction temperature per unit time needed in order to maintain the degree of conversion of the charge constant. The degree of conversion is usually measured as the volume percent of the total product which boils below a selected temperature, commonly 390° F.–650° F., typically determined by subtracting the volume percent of the product boiling above the selected temperature from 100.

EXAMPLE I

This example is designed to show the effect of pyrene content on catalyst aging. The charge stock used was an East Texas light gas oil having the following properties:

| | |
|---|---:|
| Gravity, API | 36.4 |
| Distillation, ASTM, ° F.: | |
| IBP | 462 |
| 50% | 552 |
| EP | 689 |
| Sulfur, wt. percent | 0.10 |
| Nitrogen, wt. percent | 0.02 |

Specific quantities of pyrene were added to portions of this gas oil and these portions and others which were pyrene-free were hydrocracked over two different types of catalysts. Catalyst A was a catalyst made up of 0.5 weight percent platinum deposited on an active silica-alumina base which was about 10 weight percent alumina. This base had an Activity Index of about 46 (measured in the manner described by Alexander and Shimp in National Petroleum News, 36, page R–537 [August 2, 1944]). The catalyst was prepared in the manner described in U.S. patent application Serial Number 825,016, filed July 6, 1959, now U.S. Patent 2,945,806.

Catalyst B consisted of 2.9 weight percent cobalt oxide, 8.0 weight percent molybdenum, 73.9 weight percent alumina and 15.2 weight percent silica. It was prepared in the manner described and claimed in U.S. patent application Serial Number 760,646, filed September 12, 1958.

Hydrocracking of all fractions over both catalysts was carried out under the following conditions:

| | |
|---|---:|
| Hydrogen pressure, p.s.i.g. | 1000 |
| Liquid hourly space velocity, vol./vol./hr. | 0.5 |
| Hydrogen to oil ratio, s.c.f./bbl. | 18,900 |
| Conversion to products boiling below 390° F. percent | ≈50 |

The technique of operation was to continuously adjust the reaction temperature to maintain the conversion level approximately constant, using the gravity of the liquid product as a guide. The results of the runs made were as follows:

*Table I*

| Catalyst | Pyrene in Charge, wt. Percent | C₅+ Product, vol. Percent of Charge | Aging Rate, °F./day | Calculated Average Reaction Temperature After 48 Hours for 50 vol. Percent Conversion to Products Boiling Below 390° F., °F. |
| --- | --- | --- | --- | --- |
| A | 0 | 105.2 | ≈0 | 697 |
| B | 0 | 102.1 | ≈0 | 749 |
| A | 6 | ---------- | 31.0 | 830 |
| B | 6 | ---------- | 11.7 | 838 |
| A | 3 | ---------- | 5.3 | 778 |

The data from Example I are plotted in FIGURE 1. It is evident that while pyrene affects aging of the non-platinum catalyst to a substantial degree, it affects the platinum type to a much greater extent.

Another observation that may be made based on the data of Table I is involved with the C₅+ product recorded for Catalysts A and B without pyrene addition. The C₅+ product is the volume of hydrocarbon in the product containing five carbon atoms or more expressed as a percentage of the charge. Essentially, it is equivalent to the quantity of liquid products produced by the process and since the liquid products are the valuable ones, e.g., gasoline and domestic heating oil, it is a rough indication, when compared with a similar quantity for another operation, of the relative value of the products of the two operations. The first two runs recorded in Table I indicate that the platinum type catalyst (A) can be expected to give substantially more C₅+ product than the non-platinum catalyst (B). Thus, when all else is equal, it is preferred to use the platinum type catalyst.

EXAMPLE II

The East Texas light gas oil used in Example I was also employed here with 6 weight percent pyrene added. Hydrocracking of various portions thereof over Catalysts A and B of Example I was carried out at various pressures above 1000 p.s.i.g., at a liquid hourly space velocity of 0.5 vol./vol./hr. and a conversion of about 50 percent to products boiling below 390° F. The results obtained are recorded in Table II, together with results from Example I on operation at 1000 p.s.i.g. with the 6 percent pyrene fraction.

*Table II*

| Catalyst | Hydrogen Pressure, p.s.i.g. | Aging Rate, °F./day | Calculated Average Reaction Temperature After 48 Hours for 50 vol. Percent Conversion to Products Boiling Below 390° F., °F. |
| --- | --- | --- | --- |
| A | 1,000 | 31.0 | 830 |
| B | 1,000 | 11.7 | 838 |
| A | 1,500 | 10.2 | 792 |
| A | 2,000 | 0.3 | 730 |
| B | 2,000 | 6.7 | 825 |

Figure 2:
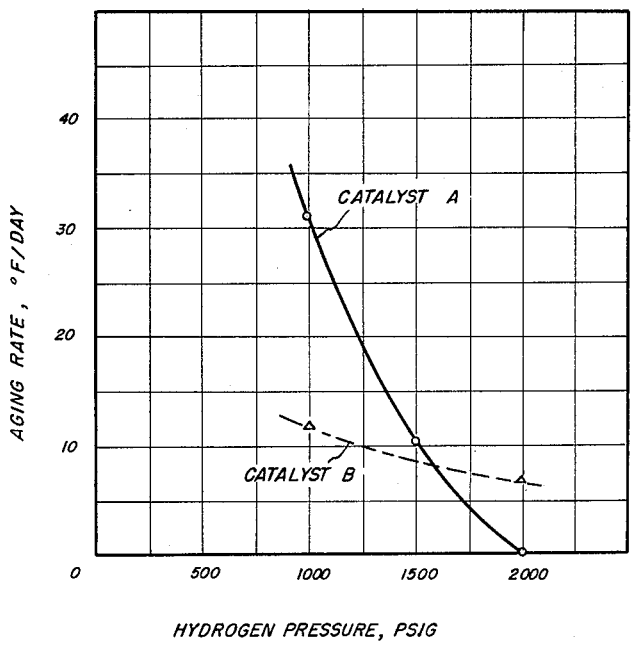
FIGURE 2 is a graph showing the relationship between hydrogen pressure and aging rate for two different catalysts used to process a pyrene-containing gas oil.

The data showing the variation in aging rate of the 6 weight percent pyrene fraction with pressure, recorded in Table II, is plotted in FIGURE 2. FIGURE 2 demonstrates that while the platinum type catalyst is much more sensitive to pyrene at 1000 p.s.i.g. than the non-platinum type, the platinum type responds much more to increases in hydrogen pressure to the point that at a pressure slightly above 1500 p.s.i.g., the platinum type actually ages at a lower rate than the non-platinum type and at 2000 p.s.i.g. the platinum type ages at close to the same rate as when processing pyrene-free charge. Our copending application Serial Number 10,164, filed February 23, 1960, makes use of this discovery to process high pyrene content charge stocks over noble metals at high pressures.

EXAMPLE III

Two runs were made over the catalysts and with the light East Texas gas oil charge described in Example I. The charge was processed, in each run, without the addition of pyrene at a hydrogen pressure of 2000 p.s.i.g., a space velocity of 0.5 vol./vol./hr. and a conversion to products boiling below 390° F. of about 50 volume percent. The data obtained are recorded in Table III.

*Table III*

| Catalyst | Aging Rate, °F./day | Calculated Average Reaction Temperature After 48 Hours for 50 vol. Percent Conversion to Products Boiling Below 390° F., °F. |
| --- | --- | --- |
| A | ≈0 | 712 |
| B | ≈0 | 763 |

Figure 3:
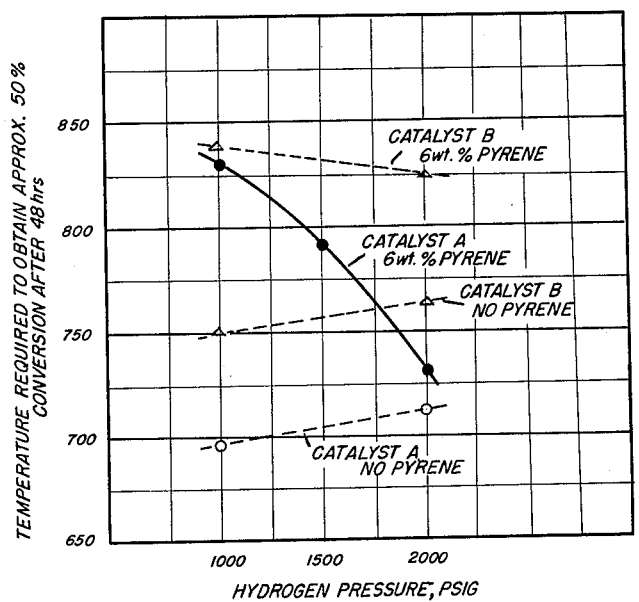
FIGURE 3 is a graph illustrating the relationship among hydrogen pressure, catalyst type, pyrene content and the reaction temperature required for 50 percent conversion.

FIGURE 3 is a plot of data from Tables I, II and III. It indicates the effect of pyrene content of the charge and hydrogen pressure on catalyst activity as indicated by the required average reaction temperature to achieve about 50 volume percent conversion to products boiling below 390° F. One thing illustrated by FIGURE 3 is the greater activity of the platinum catalyst as compared with the non-platinum, both with and without pyrene. This is another reason why, if all else is equal, this catalyst will be preferred over the non-platinum one. However, as FIGURE 2 indicates, under some conditions the platinum type will lose this activity at a much faster rate than the non-platinum. FIGURE 3 also illustrates the very marked response of the operation over the platinum type catalyst to hydrogen pressure when processing high pyrene charge stocks.

FIGURE 2 shows, of course, that it would be possible to minimize aging due to pyrene by conducting the conversion of the entire charge stock at a high pressure, such as 2000 pounds per square inch gauge. This would require one or more large reaction vessels designed to accommodate this process. In this invention, however, an advantage over this system is obtained by separating the charge stock into a fraction which contains less than 1 percent pyrene and a second fraction containing more than 1 percent pyrene. The first fraction is hydrocracked over a catalyst which employs a noble metal of the platinum and palladium series as a hydrogenation component at a low pressure below 1500 p.s.i.g. The second fraction is hydrocracked over a catalyst which uses a hydrogenation component other than a noble metal of the platinum and palladium series.

It will be apparent that with this process the fraction which contains the reduced amount of pyrene has the advantage of hydrocracking over the platinum series noble metal catalyst at modest pressures. Thus, this fraction will produce the superior product quality and distribution characteristic of the noble metal catalysts at a minimum aging rate. The high pyrene fraction is converted over a catalyst which is not so sensitive to aging due to pyrene. The cover-all process, therefore, will have marked advantages over the more conventional operations.

Figure 4:
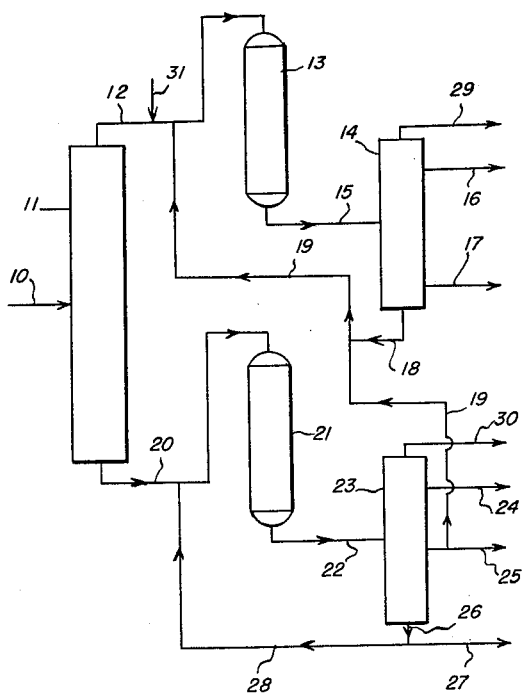
FIGURE 4 is a diagrammatic flow plan illustrating one application of the process of this invention.

One application of this process is illustrated in FIGURE 4. The charge stock containing at least 1 weight percent pyrene is admitted through line 10 to a separation vessel 11, in which the charge stock is separated into a low pyrene fraction with less than 1 weight percent pyrene, preferably less than 0.5 weight percent pyrene, and a high pyrene fraction with a pyrene content greater than 1 weight percent. This separation may be made by fractionation or any other operation such as solvent extraction designed to separate the charge stock into the required high and low pyrene fractions.

The low pyrene fraction is removed through line 12 and is passed to hydrocracking reactor 13. This reactor is filled with a catalyst having both hydrogenation and cracking activity, i.e., a dual function catalyst. The hydrogenation component of the catalyst should be a metal of the platinum and palladium series, i.e., those metals having Atomic Numbers 44 to 46, inclusive, and 76 to 78, inclusive. The metal should be deposited on a base having cracking activity such as synthetic composites of two or more of the oxides of the metals of Groups IIA, IIIB, IVA and IVB of the Periodic Arrangement of Elements [J. Chem. Ed. 16, 409 (1939)]. Preferably, this catalyst should be one of the catalysts described in U.S. patent application Serial Number 825,016, filed July 6, 1959, now U.S. Patent 2,945,806, which comprise 0.05 to 20 percent by weight of the catalyst of at least one platinum and palladium series metal deposited on a synthetic composite selected from the group consisting of silica-alumina, silica-zirconia, silica-alumina-zirconia, silica-alumina-thoria, alumina-boria, silica-magnesia, silica-alumina-magnesia and silica-alumina-fluorine. This base should preferably have an Activity Index greater than 25 as measured by the "Cat. A" test described by Alexander and Shimp in "National Petroleum News", 36, page R–537 (August 2, 1944). Within the broad scope of this invention the Activity Index of the base may be lower, if desired. The catalysts having platinum and palladium series metals as hydrogenation components are referred to herein as "Type A" catalysts.

The reaction conditions in reaction vessel 13 will include a hydrogen pressure below 1500 pounds per square inch gauge. Generally, this pressure should be within the range 500 to 1500 pounds per square inch gauge and preferably 1000 to 1500 p.s.i.g. The space velocity will usually fall within the range 0.25 to 4 volumes of reactant (as 60° F. liquid) per volume of catalyst per hour. In the reactor, hydrogen, in an amount of about 5000 to 30,000 standard cubic feet per barrel of charge thereto, should be present and the reaction temperature should usually fall within the range 600 to 850° F.

The products of the reaction, after removal of hydrogen in conventional manner (not shown), may be supplied to a fractionator 14 through line 15. In fractionator 14 it may be divided into suitable products such as gasoline removed at line 16 and a light distillate suitable for domestic heating oil or jet fuel at line 17. Gas is removed at 29. When the low pyrene fraction is the lower boiling portion of the hydrocarbon charge stock, material heavier than about 600° F. will usually not be produced. If the products of reactor 13 do contain heavier material, however, it may be recycled to reactor 13 through lines 18 and 19.

The high pyrene content fraction passes from separation vessel 11 through line 20 into reaction vessel 21. This reaction vessel employs a hydrocracking catalyst which has a hydrogenation component other than a metal of the platinum and palladium series. Generally, such catalysts will have a hydrogenation component derived from the metals of Group VIA and Group VIII, first transition series (Atomic Numbers 26–28), of the Periodic Arrangement of Elements [J. Chem. Ed., 16, 409 (1939)]. The hydrogenation component may employ the uncombined metals or their oxides or sulfides. The oxides of cobalt and molybdenum, the sulfides of nickel and tungsten and the metals nickel, tungsten and iron are specific examples of such hydrogenation components. The hydrogenation component will usually be deposited on or combined with a base which has cracking activity, such as silica-alumina. Particular examples of these catalysts are molybdena-silica-alumina, tungsten on acid treated clay, nickel-tungsten-silica-alumina, and iron on silica-alumina. A particularly preferred catalyst is that described and claimed in U.S. patent application Serial Number 760,646, filed September 12, 1958. This catalyst is a composite of 15 to 40 percent by weight silica, 3 to 20 percent by weight molybdenum trioxide, 1 to 8 percent by weight cobalt oxide and the remainder alumina.

The reaction conditions in reactor 21 will, of course, vary with the particular charge stock and catalyst used. Generally, the hydrogen pressure will fall within the range 1000 to 3000 pounds per square inch gauge, the space velocity within the range 0.25 to 4 volumes of reactant (as 60° F. liquid) per volume of catalyst per hour, an amount of hydrogen in the reactor amounting to 3000 to 20,000 standard cubic feet per barrel of reactant and a reaction temperature within the range about 700 to 900° F. The product of reactor 21 is passed by line 22 into a fractionator 23. This product may be separated into desirable components such as gasoline removed through line 24 and light fuel oil through line 25. Gas may be removed at 30.

If it is desired, part or all of this light fuel oil may be passed through line 19 to reactor 13, since it will be low in pyrene content. Material heavier than at least about 650° F., which will contain a high pyrene content, may be removed at line 26 and a part or all discarded from the system through line 27 or recycled to reactor 21 by means of line 28.

This invention, therefore, takes advantage of our discovery of the significant role of pyrene in catalyst aging by concentrating the pyrene in a part of the charge stock and processing this part of the charge over a non-platinum type catalyst which is, on a relative basis, not sensitive to pyrene; and contacting the remaining low pyrene fraction over a platinum type catalyst where the benefits of the better product distribution which this catalyst gives and the benefit of a low operating pressure are obtained.

The specific nature of pyrene in causing catalyst aging is demonstrated in Example IV.

EXAMPLE IV

To portions of the light East Texas gas oil described in Example I, there were added 12 weight percent 2-methylnaphthalene and 12 weight percent phenanthrene. These portions were then hydrocracked over Catalyst A and Catalyst B, described in Example I. The reaction conditions included a hydrogen pressure of 1000 p.s.i.g., a space velocity of 0.5 vol./vol./hr., a hydrogen to charge ratio of 18,900 standard cubic feet per barrel and a reaction temperature suitable to effect about 50 volume percent conversion to products boiling below 390° F. The results of these runs are given in Table IV. Table IV also includes data from Table I on aging without an added compound and with pyrene for comparative purposes.

Table IV

| Compound Added | Concentration of Compound Added, wt. Percent of Charge | Catalyst | Aging Rate, °F./Day |
|---|---|---|---|
| 2-methylnaphthalene | 12 | A | ≈0 |
| Do | 12 | B | 0.5 |
| Phenanthrene | 12 | A | ≈0 |
| Do | 12 | B | 3.8 |
| Pyrene | 6 | A | 31.0 |
| Do | 6 | B | 11.7 |
| None | | A | ≈0 |
| Do | | B | ≈0 |

Table IV indicates that the fused two-ring (2-methylnaphthalene) and three-ring (phenanthrene) compounds do not have an effect comparable in magnitude to the fused four-ring compound (pyrene). When hydrocracked over the platinum type catalyst, the two- and three-ring compounds did not seem to contribute to aging at all. Over the non-platinum type catalyst, the two- and three-ring compounds did cause some aging but nothing which approached in magnitude the pyrene aging.

The data of Table I do indicate that it would be desirable if the two- and three-ring compounds were cracked with the low pyrene content fraction over the platinum type catalyst. This may readily be accomplished in this invention when the separation is accomplished by distillation if the end boiling point of the low pyrene fraction is maintained within the range about 650° F. to 800° F., dependent on the type and boiling range of the charge to the fractionator.

As indicated above, the low pyrene content fraction supplied to reactor 13 and the platinum type catalyst therein should have a pyrene content less than 1 weight percent and preferably less than 0.5 weight percent. If the material removed from separator 11 through line 12 does not meet this requirement, a diluent hydrocarbon containing little or no pyrene may be added through line 31 to produce a blend which does meet the limitation.

Pyrene content of any fraction may be determined by by conventional mass spectroscopy.

Most of the conventional petroleum cracking charge stocks, such as wide range gas oils, long residua, deasphalted residua, thermal and coker gas oils, heavy gas oils, catalytic gas oils and the like, may be used in this invention. In addition, stocks comparable to the petroleum stocks but derived from non-petroleum sources, such as shale oil and coal tars, may be employed. It is a requirement of this invention that the charge stock have at least 1 weight percent pyrene. Suitable charge stocks will generally boil above 390° F.

As previously indicated, the simplest method of separating the charge into the required high and low pyrene fractions is distillation. Usually the lower boiling fraction will be the one with low pyrene content but with some charge stocks this may not be so. Where the lower boiling fraction is to be the low pyrene one, maintenance of the end boiling point of the low boiling fraction within the range about 650° F. to 800° F. will effect satisfactory separation to produce high and low pyrene fractions according to the previous specifications. As also indicated above, other methods of separating the charge, such as solvent extraction and selective adsorption, may be used.

EXAMPLE V

In this example a Guico full range gas oil which had the following properties was employed.

Gravity, API _____ 29.2
Boiling range, °F.:
    IBP _____ 390
    50% _____ 696
    95% _____ 877
Pyrene, wt. percent _____ 1.7
Sulfur, wt. percent _____ 0.66
Nitrogen, wt. percent _____ 0.07

The catalyst used comprised 0.48 weight percent platinum deposited on a silica-alumina base having a surface area of 412 square meters per gram. The reaction conditions and products obtained are recorded in Table VI.

EXAMPLE VI

Another portion of this gas oil of Example V was fractionated into high and low pyrene content fractions having the following properties:

*Table V*

| | Low Pyrene Fraction | High Pyrene Fraction |
|---|---|---|
| Vol. percent of Gas Oil | 39.7 | 60.3 |
| Gravity, API | 32.2 | 26.8 |
| Boiling Range: | | |
|   IBP | 449 | 602 |
|   50% | 561 | 781 |
|   95% | 660 (99%) | 885 |
| Sulfur, wt. percent | 0.43 | 0.79 |
| Nitrogen, wt. percent | 0.015 | 0.08 |
| Pyrenes, wt. percent | 0.2 | 2.7 |

The low pyrene fraction was hydrocracked over a Type A catalyst which consisted of 0.49 weight percent platinum deposited on a silica-alumina base with a surface area of 421 square meters per gram. The reaction conditions used and products produced are given in Table VI. Similarly, the high pyrene fraction was hydrocracked over the non-platinum Type B catalyst which was described as Catalyst B in Example I. The conditions of operation and products obtained are also recorded in Table VI.

*Table VI*

| Charge | Full Range Gas Oil | Low Pyrene Fraction | High Pyrene Fraction |
|---|---|---|---|
| Reaction Conditions: | | | |
|   Catalyst Type | A | A | B |
|   Pressure, p.s.i.g. | 1,000 | 1,000 | 2,000 |
|   Space Velocity, vol./vol./hr. | 0.5 | 0.5 | 0.5 |
|   H₂/Oil, s.c.f./bbl. | 15,400 | 18,900 | 14,500 |
|   Temp., °F. | 776 | 707 | 837 |
| Conversion to Products Boiling Below 390° F., Vol. Percent | 51.5 | 53.7 | 59.0 |
| Conversion to Products Boiling Below 650° F., Vol. Percent | 94.5 | ---------- | 100.0 |
| Products: | | | |
|   Dry Gas, wt. percent | 4.6 | 1.6 | 4.9 |
|   C₄'s, vol. percent | 9.4 | 7.3 | 6.8 |
|   C₅'s, vol. percent | 6.9 | 7.0 | 5.8 |
|   C₆–390° F. Naphtha, Vol. Percent | 44.8 | 53.9 | 60.3 |
|   390–650° F. Fuel Oil, Vol. Percent of Charge | 43.1 | 46.3 | 41.1 |
|   650° F.+, Vol. Percent of Charge | 5.5 | None | None |
|   C₅+ Products, Vol. Percent of Charge | 100.3 | 107.2 | 107.2 |
| Aging Rate, °F./Day | 2.7±0.3 | 0.1±0.2 | 0.1±0.2 |

The results of Examples V and VI clearly demonstrate the advantages of this invention. When the invention is not used and full range gas oil is hydrocracked at a modest pressure over the platinum type catalyst, the aging rate is 2.7° F. per day. This would not be considered satisfactory for a commercial operation. When this invention is employed, this aging rate is reduced to 0.1° F. per day. Also, without this invention the C₅+ products amounted to 100.3 volume percent of the volume of the charge. On the other hand, when this invention was used the C₅+ products were 107.2 volume percent of the charge, an increased yield of 6.9 volume percent in valuable liquid product. Furthermore, this was accomplished by processing only 60 volume percent of the charge at the higher pressure of 2000 p.s.i.g.

This invention should be understood to cover all changes and modifications of the examples of the invention, herein chosen for purposes of disclosure, which do not constitute departures from the spirit and scope of the invention.

We claim:

1. A process for hydrocracking a hydrocarbon charge containing at least 1 weight percent pyrenes to lower boiling products, which comprises: dividing said hydrocarbon fraction into a first fraction containing less than 1 weight percent pyrenes and a second fraction containing more than 1 weight percent pyrenes; hydrocracking said first fraction by contacting said first fraction under hydrocracking reaction conditions which include a hydrogen pressure below about 1500 p.s.i.g. with a dual function hydrocracking catalyst which employs at least one noble metal of the platinum and palladium series as a hydrogenation component; hydrocracking said second fraction by contacting said second fraction under hydrocracking reaction conditions with a dual function catalyst which employs a hydrogenation component other than a noble metal of the platinum and palladium series to produce lower boiling products, whereby said charge is converted to high yields of desirable products while the aging of said catalyst is minimized.

2. The process of claim 1 further limited to the catalyst employed to hydrocrack the first fraction comprising 0.05 to 20 weight percent of at least one metal selected from the group consisting of metals having Atomic Numbers of 44 to 46, inclusive, and 76 to 78, inclusive, deposited on a composite of solid refractory oxides of at least two elements of Groups IIA, IIIB, IVA and IVB of the Periodic Arrangement of Elements having an Activity Index of at least 25 and the catalyst employed to hydrocrack said second fraction comprising a composite of 15 to 40 percent by weight silica, 3 to 20 percent by weight molybdenum trioxide, 1 to 8 percent by weight cobalt oxide and the remainder alumina.

3. The process of claim 1 further restricted to reaction conditions for hydrocracking said first fraction, including a hydrogen pressure within the range about 500 to 1500 p.s.i.g. and a temperature within the range about 600 to 850° F.; and the reaction conditions for hydrocracking said second fraction including a hydrogen pressure within the range about 1000 to 3000 p.s.i.g. and a temperature within the range about 700 to 900° F.

4. The process of claim 1 further limited to said first fraction having a less than 0.5 weight percent pyrenes while said second fraction has greater than 0.5 weight percent pyrenes.

5. A process for hydrocracking a hydrocarbon charge containing at least 1 weight percent pyrenes, which comprises: separating said charge distillation into a lower boiling portion containing less than 1 weight percent pyrenes and a high boiling portion containing more than 1 weight percent pyrenes; hydrocracking said lower boiling portion by contacting said lower boiling portion in a first hydrocracking zone under hydrocracking reaction conditions which include a hydrogen pressure below about 1500 p.s.i.g. with a dual function hydrocracking catalyst which employs at least one metal selected from the group consisting of the metals having Atomic Numbers 44, 45, 46, 76, 77 and 78 as a hydrogenation component; hydrocracking said high boiling portion by contacting said high boiling portion in a second reaction zone under hydrocracking reaction conditions with a dual function hydrocracking catalyst which has a hydrogenation component that does not include any of the metals having Atomic Numbers 44, 45, 46, 76, 77 and 78; separating the material boiling above 650° F. from the products of hydrocracking said high boiling portion and returning at least a part of said material boiling above about 650° F. to said second reaction zone to undergo further hydrocracking.

6. The process of claim 5 wherein at least a part of the product of said second reaction zone boiling above the gasoline boiling range but below about 650° F. is passed to said first reaction zone to be further hydrocracked.

References Cited in the file of this patent

UNITED STATES PATENTS

| | | |
|---|---|---|
| 2,304,289 | Tongberg | Dec. 8, 1942 |
| 2,627,495 | Lanning | Feb. 3, 1953 |
| 2,692,224 | Heinemann | Oct. 19, 1954 |
| 2,854,401 | Weisz | Sept. 30, 1958 |

OTHER REFERENCES

Chemical Constituents of Petroleum, Sachanen, pages 246–247, Reinhold Pub. Co., New York, 1945.